(12) United States Patent
Sullivan

(10) Patent No.: US 9,405,532 B1
(45) Date of Patent: Aug. 2, 2016

(54) INTEGRATED CLOUD PLATFORM TRANSLATION SYSTEM

(71) Applicant: NetSuite Inc., San Mateo, CA (US)

(72) Inventor: Craig Sullivan, Kingsburg, CA (US)

(73) Assignee: NetSuite Inc., San Mateo, CA (US)

( * ) Notice: Subject to any disclaimer, the term of this patent is extended or adjusted under 35 U.S.C. 154(b) by 0 days.

(21) Appl. No.: 14/195,157

(22) Filed: Mar. 3, 2014

Related U.S. Application Data

(60) Provisional application No. 61/773,367, filed on Mar. 6, 2013.

(51) Int. Cl.
*G06F 17/28* (2006.01)
*G06F 9/44* (2006.01)

(52) U.S. Cl.
CPC .......................................... *G06F 8/71* (2013.01)

(58) Field of Classification Search
CPC ............... G06F 7/78; G06F 8/00–8/78; G06F 9/44–9/455; G06F 11/36
See application file for complete search history.

(56) References Cited

U.S. PATENT DOCUMENTS

| | | | | |
|---|---|---|---|---|
| 2008/0127045 A1* | 5/2008 | Pratt | ...................... | G06F 9/4448 717/104 |
| 2009/0241115 A1* | 9/2009 | Raffo | ...................... | G06Q 30/02 718/100 |
| 2009/0271175 A1* | 10/2009 | Bodin et al. | ...................... | 704/2 |
| 2013/0103391 A1* | 4/2013 | Millmore et al. | ...................... | 704/9 |
| 2013/0144596 A1* | 6/2013 | Lui | ...................... | G06F 17/2705 704/2 |
| 2014/0164529 A1* | 6/2014 | Kleppmann et al. | ...................... | 709/206 |

OTHER PUBLICATIONS

Blaser, A Reusable Lexcial Database Tool for Machine Translation, 1992.*

* cited by examiner

*Primary Examiner* — Wei Zhen
*Assistant Examiner* — Zhan Chen
(74) *Attorney, Agent, or Firm* — Lane Powell PC

(57) ABSTRACT

Systems, apparatuses and methods for use in the development of software applications or extensions to applications, user interfaces or similar products. Specifically, the invention is directed to an efficient process for developing software applications for markets in which different languages are spoken, typically as part of an internationalization strategy. The inventive systems and processes may also be used to produce software applications for a single geographic market in which multiple languages are spoken. The inventive process involves providing a development environment for software applications in which multiple users may generate customized applications based on access to a common set of applications, functional modules, translation elements, translated strings, etc. The inventive system, apparatus, and method for generating software applications in multiple languages is more efficient than presently known methods and ensures completeness and consistency of terminology in the translation into other languages.

20 Claims, 6 Drawing Sheets

INTEGRATED CLOUD PLATFORM TRANSLATION SYSTEM

CROSS REFERENCE TO RELATED APPLICATION

This application claims the benefit of U.S. Provisional Application No. 61/773,367, entitled "Integrated Cloud Platform Translation System," filed Mar. 6, 2013, which is incorporated herein by reference in its entirety (including the appendix), for all purposes.

BACKGROUND

Modern computer networks incorporate layers of virtualization so that physically remote computers and computer components can be allocated to a particular task and then reallocated when the task is done. Users sometimes speak in terms of computing "clouds" because of the way groups of computers and computing components can form and split responsive to user demand, and because users often never see the computing hardware that ultimately provides the computing services. More recently, different types of computing clouds and cloud services have begun emerging.

For the purposes of this description, cloud services may be divided broadly into "low level" services and "high level" services. Low level cloud services (sometimes called "raw" or "commodity" services) typically provide little more than virtual versions of a newly purchased physical computer system: virtual disk storage space, virtual processing power, an operating system, and perhaps a database such as an RDBMS. In contrast, high or higher level cloud services typically focus on one or more well-defined end user applications, such as business oriented applications. Some high level cloud services provide an ability to customize and/or extend the functionality of one or more of the end user applications they provide; however, high level cloud services typically do not provide direct access to low level computing functions.

Some high level cloud based services may permit a user to not only customize existing applications, but also to create new applications, processes, or data flows that satisfy a specific need of that user. This may include a need to provide a version of an application for use in one or more markets. Since some of these markets may be in locations in which different languages are spoken, an international marketing plan may include the capability to provide applications in more than a single language. This means that user interfaces, help functions, operating instructions, and even comments contained in software code may need to be translated into one or more languages. Additionally, where such cloud based services provide for new applications, processes, or data flows to be deployed within the cloud based services' existing user interface (and hence are desired to become a seamless part of the user experience of that service platform), it is critical for ease of use and user adoption that the user interface elements for the new applications, processes, or data flows be consistent in look and feel, including the use of standard terminology both in the original language and in any translations to other languages.

Unfortunately, accomplishing this translation can be a difficult and inefficient process. Typically, a software vendor will develop an application and then translate all (or essentially all of the significant) instances of one language into a second language to produce a version of the application for a new market. However, this approach has several disadvantages, including but not limited to:

- A significant amount of manual effort is typically required, and there are many possible sources of inefficiency in managing the translation process;
- Achieving a high quality (and hence reliable) translation can be an expensive and time-consuming process, involving multiple review and approval steps to build knowledge into the solution and to identify domain expertise; and
- Existing translation solutions (which may be automated, semi-automated, or manual) don't enable developers to fully leverage existing content translation data stores and related content to ensure consistency across the user experience for their own products, to reduce the requirement for additional translation services, or permit other users and developers to access previously generated translation tools and thereby speed up their own development processes.

As noted, methods presently exist for generating software applications in more than a single language as part of providing an "internationalization" strategy for a company. However, conventional methods typically suffer from one or more disadvantages, including requiring a large amount of time to implement, increasing the cost of software development, and introducing other inefficiencies into the software development process. Further, conventional systems and methods may not ensure completeness and consistency of terminology in the translation into other languages. Embodiments of the invention are directed toward solving these and other problems individually and collectively.

SUMMARY

The terms "invention," "the invention," "this invention" and "the present invention" as used herein are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

Embodiments of the invention are directed to systems, apparatuses and methods for use in the development of software applications. Specifically, the invention is directed to an efficient process for developing software applications for markets in which different languages are spoken, typically as part of an internationalization strategy. The inventive systems and processes may also be used to produce software applications for a single geographic market in which multiple languages are spoken. The inventive process involves providing a development environment for software applications in which multiple users may generate customized applications based on access to a common set of applications, functional modules, translation elements, translated strings, etc. The inventive system, apparatus, and method for generating software applications in multiple languages is more efficient than presently known methods and ensures completeness and consistency of terminology in the translation into other languages.

In one embodiment, the development environment is a multi-tenant, "cloud" based environment, typically used to develop web services and business applications for end users. Such an environment may include a multi-tenant business data processing platform or system, or other form of distributed computing platform. The platform may include "software tools" to enable users to define and implement user interfaces, software applications, data structures and/or extensions to such elements. In one embodiment, the inventive process includes identifying which of a set of user interface elements (or other content) identified by a user of the development environment requires translation, and if so, automatically determining if a translated version of that element exists in a commonly accessible data store that may be accessed by a plurality of users of the development environment (e.g., a plurality of tenants of the multi-tenant data processing platform). In some embodiments, this may include determining if a desired user interface element or other content has an exact equivalent, a substantial equivalent, or a similar enough version expressed in a desired language that is available in the commonly accessible data store. If a suitable translated version does exist, then that content is automatically recommended to the user of the development environment for inclusion in the application they are developing. In some embodiments, this permits users to determine if a "standard" or commonly used word or phrase is available that may be used for a data field or other intended use by conducting a search of the database. In some embodiments, a user may enter their own text and the invention will search for and display similar text found in the database that might be of interest to the user.

If a suitable (e.g., exact, substantially similar, similar, etc.) translated version does not exist (based on an applied matching or similarity measure, rule base, heuristic, or algorithm), then the content contained in the user interface element may be processed into a form in which it may be provided to a translation service. The translation service in return may provide the desired translated content in one or more formats. The translated content may then be used by the developer and added to the commonly accessible data store. This enables the newly translated content to be accessed by others who are developing applications within the development environment. Note that although the inventive system, apparatus and method have been described primarily in the context of a user interface, they may also be used to provide translations for other content, such as help files, user manuals, marketing material, code comments, reports, articles, etc.

In one embodiment, the invention is directed to a multi-tenant data processing system, where the system includes
- one or more business related data processing applications installed in the system and accessible by a plurality of tenants of the multi-tenant data processing system;
- a data storage element accessible by a plurality of tenants of the multi-tenant data processing system;
- a set of software development tools to enable a tenant to develop one or more of a new business related data processing application, an extension to one of the one or more business related data processing applications, a new user interface, an extension to an existing user interface, or content related to an application or user interface;
- a plurality of language segments in one or more languages stored in the data storage element; and
- a processor programmed with a set of instructions, wherein when executed by the processor the instructions cause the system to
  - receive a request from a first tenant for a language segment in a specified language;
  - determine if the request can be satisfied by a language segment contained in the data storage element;
  - provide the language segment contained in the data storage element if the request can be satisfied;
  - generate a request for translation services if the request cannot be satisfied by a language segment contained in the data storage element;
  - transfer the request to a provider of the translation services;
  - receive a response to the request from the provider of the translation services;
  - process the received response to validate the contents of the response;
  - provide the translated language segment to the first tenant;
  - determine if the translated language segment is suitable for including in the data storage element;
  - store the translated language segment in the data storage element if the translated language segment is suitable for including in the data storage element;
  - receive a request from a second tenant for a language segment in a specified language; and
  - provide the translated language segment received in response to the request for translation services to the second tenant in response to the request from the second tenant.

In another embodiment, the invention is directed to a system for developing a software application, where the system includes
- a data storage element storing a plurality of language segments in one or more languages;
- a processor programmed with a set of instructions, wherein when executed by the processor the instructions cause the system to
  - receive a request from a first user for a language segment in a specified language;
  - determine if the request can be satisfied by a language segment contained in the data storage element;
  - provide the language segment contained in the data storage element if the request can be satisfied;
  - generate a request for translation services if the request cannot be satisfied by a language segment contained in the data storage element;
  - transfer the request to a provider of the translation services;
  - receive a response to the request from the provider of the translation services;
  - process the received response to validate the contents of the response;
  - provide the translated language segment to the first user;
  - determine if the translated language segment is suitable for including in the data storage element;
  - store the translated language segment in the data storage element if the translated language segment is suitable for including in the data storage element;
  - receive a request from a second user for a language segment in a specified language; and
  - provide the translated language segment received in response to the request for translation services to the second user.

In yet another embodiment, the invention is directed to a method for developing software, where the method includes
- providing one or more business related data processing applications installed on a multi-tenant data processing platform and accessible by a plurality of tenants of the multi-tenant data processing platform;

providing a data storage element accessible by a plurality of tenants of the multi-tenant data processing platform;

providing a set of software development tools to enable a tenant to develop one or more of a new business related data processing application, an extension to one of the one or more business related data processing applications, a new user interface, an extension to an existing user interface, or content related to an application or user interface;

providing a plurality of language segments in one or more languages stored in the data storage element; and providing a processor programmed with a set of instructions, wherein when executed by the processor the instructions cause the multi-tenant data processing platform to receive a request from a first tenant for a language segment in a specified language;

determine if the request can be satisfied by a language segment contained in the data storage element;

provide the language segment contained in the data storage element if the request can be satisfied;

generate a request for translation services if the request cannot be satisfied by a language segment contained in the data storage element;

transfer the request to a provider of the translation services;

receive a response to the request from the provider of the translation services;

process the received response to validate the contents of the response;

provide the translated language segment to the first tenant;

determine if the translated language segment is suitable for including in the data storage element;

store the translated language segment in the data storage element if the translated language segment is suitable for including in the data storage element;

receive a request from a second tenant for a language segment in a specified language; and provide the translated language segment received in response to the request for translation services to the second tenant in response to the request from the second tenant.

Other objects and advantages of the present invention will be apparent to one of ordinary skill in the art upon review of the detailed description of the present invention and the included figures.

BRIEF DESCRIPTION OF THE DRAWINGS

Embodiments of the invention in accordance with the present disclosure will be described with reference to the drawings, in which.

Note that the same numbers are used throughout the disclosure and figures to reference like components and features.

DETAILED DESCRIPTION

Figure 1:
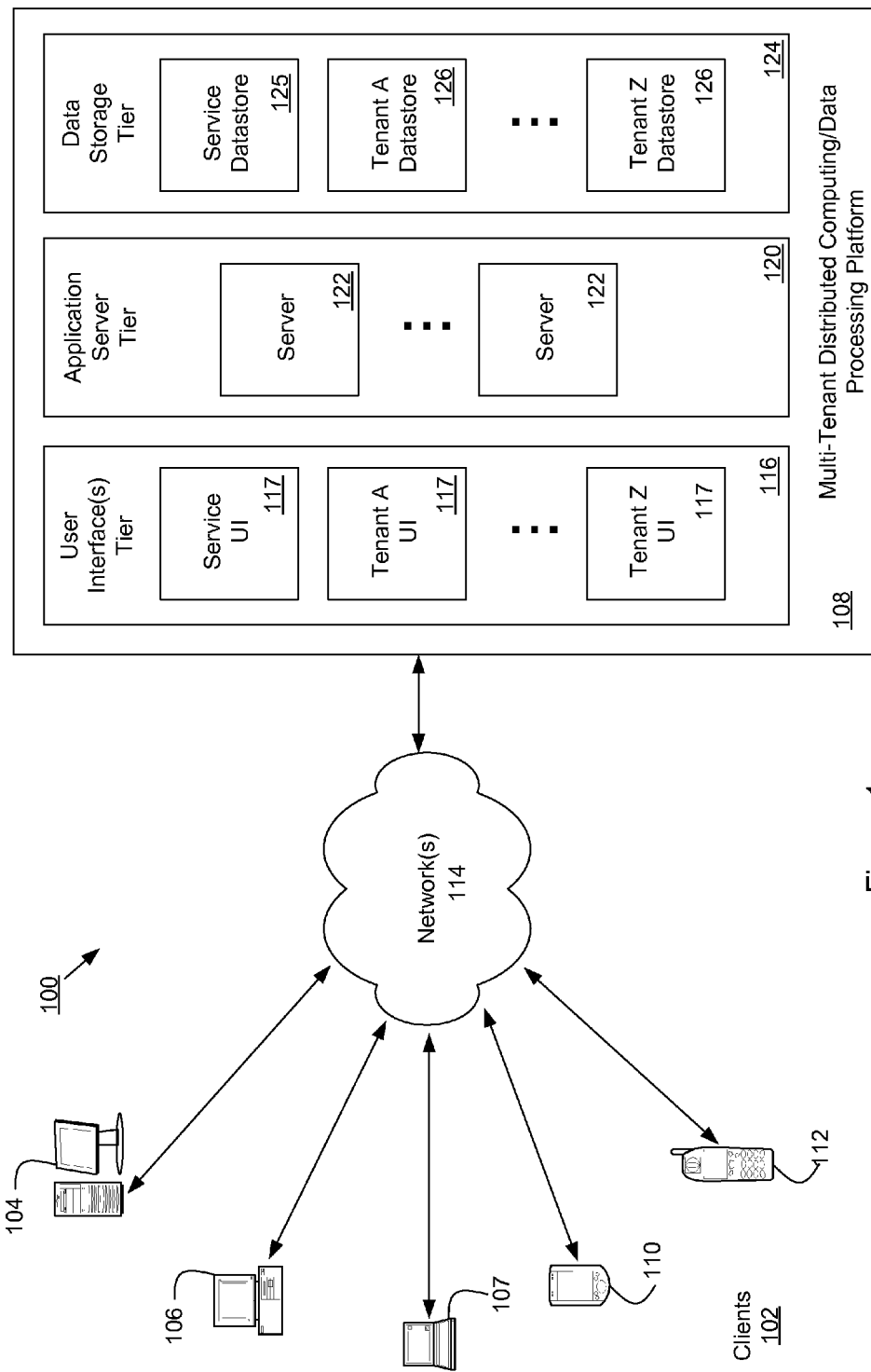
FIG. 1 is a diagram illustrating elements of an example software development or computing environment or architecture in which an embodiment of the invention may be implemented.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

This description discusses illustrative embodiments of the inventive system and methods. It is presented with reference to the accompanying drawings in order to provide a person having ordinary skill in the relevant art with a full, clear, and concise description of the subject matter defined by the claims which follow, and to enable such a person to appreciate and understand how to make and use the invention. However, this description should not be read to limit the scope of the claimed subject matter, nor does the presence of an embodiment in this description imply any preference of the described embodiment over any other embodiment, unless such a preference is explicitly identified herein. It is the claims, not this description or other sections of this document or the accompanying drawings, which define the scope of the subject matter to which the inventor and/or the inventor's assignee(s) claim exclusive entitlement.

Among other embodiments, the invention may be embodied in whole or in part as a system, as one or more processes, operations, methods, or functions, or as one or more apparatuses or devices. Embodiments of the invention may take the form of an entirely hardware implemented embodiment, an entirely software implemented embodiment or an embodiment combining software and hardware aspects. For example, in some embodiments, one or more of the operations, functions, processes, or methods described herein may be implemented by a suitable processing element (such as a processor, microprocessor, CPU, controller, etc.) that is programmed with a set of executable instructions (e.g., software instructions), where the instructions may be stored in a suitable data storage element. The processor, microprocessor, CPU or controller may be a component or element of a computing device or data processing device or platform, such as a client device or a server used with an associated data storage element or database. In some embodiments, one or more of the operations, functions, processes, or methods described herein may be implemented by a specialized form of hardware, such as a programmable gate array, application specific integrated circuit (ASIC), or the like. The following detailed description is, therefore, not to be taken in a limiting sense.

Embodiments of the invention are directed to systems, apparatuses, and methods for use in developing software applications within a multi-tenant computing environment. Specifically, embodiments of the invention are directed to systems and methods for efficiently enabling the development of a software application in more than one language by leveraging the use of a commonly accessible database containing translated versions of user interface and other content, along with the services of a translation platform.

FIG. 1 is a diagram illustrating elements of an example software development or computing environment or architecture 100 in which an embodiment of the invention may be implemented. A variety of clients 102 incorporating and/or incorporated into a variety of computing devices may communicate with a multi-tenant distributed computing/data processing platform 108 through one or more networks 114. For example, a client may incorporate and/or be incorporated into a client application implemented at least in part by one or more of the computing devices. Examples of suitable computing devices include personal computers, server computers 104, desktop computers 106, laptop computers 107, notebook computers, tablet computers, personal digital assistants (PDAs) 110, smart phones 112, cell phones, and consumer electronics incorporating one or more computing device components (such as one or more processors and data storage elements). Examples of suitable networks 114 include networks that utilize wired and/or wireless communication technologies and networks operating in accordance with any suitable networking and/or communications protocol (e.g., the Internet).

The multi-tenant distributed computing/data processing platform 108 may include multiple processing tiers or layers, including a user interface layer 116, an application layer 120, and a data storage layer 124. The user interface layer 116 may include multiple user interfaces 117, including graphical user interfaces and/or web-based interfaces. The user interfaces may include a default user interface for the service (illustrated as "Service UI" in the figure), as well as one or more user interfaces customized by one or more tenants of the service. The default user interface may include components enabling tenants to maintain custom user interfaces, provide service platform extensions, and otherwise administer their participation in the service. Each tier or layer may be implemented with a set of computers and/or computing device components including computer servers that contain processing elements programmed to execute a set of software instructions. The data storage layer 124 may include a core service data store 125 as well as a data store 126 dedicated to each tenant. The data storage layer may include one or more production data stores and one or more testing, validation and/or backup data stores. Data stores may be implemented with any suitable data storage technology including structured query language (SQL) based relational database management systems (RDBMS).

Figure 2:
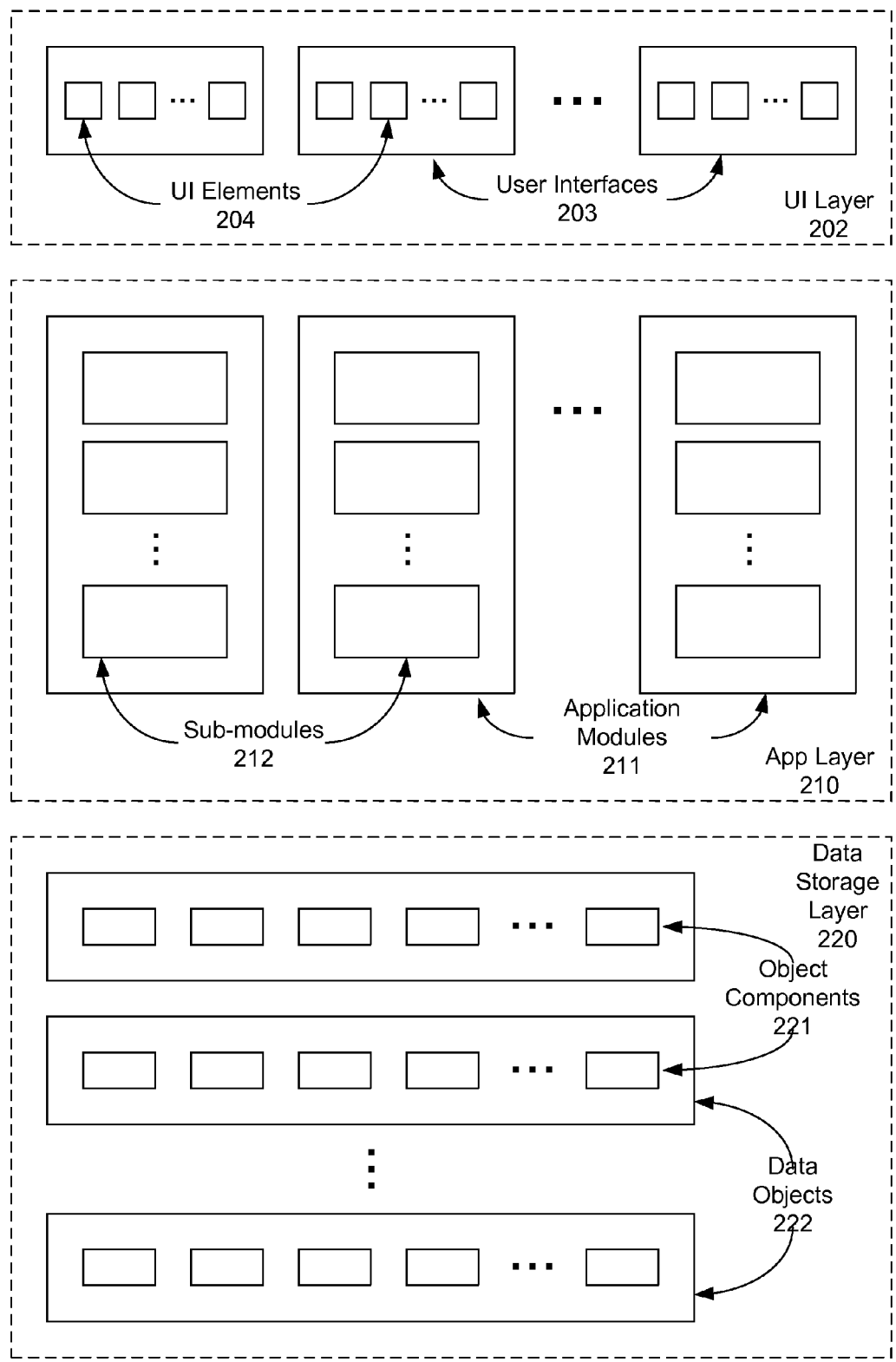
FIG. 2 is a diagram illustrating elements of an example multi-tenant data processing or distributed computing service platform in which an embodiment of the invention may be implemented.

FIG. 2 is a diagram illustrating elements of an example multi-tenant data processing or distributed computing service platform 200 in which an embodiment of the invention may be implemented (for example, element 108 of FIG. 1). The software architecture depicted in FIG. 2 represents an example of a software system in which an embodiment of the invention may be implemented. In general, an embodiment of the invention (as well as aspects of the software system) may be implemented as a set of software instructions that are designed to be executed by a suitably programmed processing element (such as a CPU, microprocessor, processor, controller, computing device, etc.). In a software system such instructions are typically arranged into "modules" with each such module performing a specific task, process, function, or operation. The entire set of modules may be controlled or coordinated in their operation by an operating system (OS) or other form of organizational platform.

The example architecture depicted in FIG. 2 includes a user interface (UI) layer or tier 202 having one or more user interfaces 203. Examples of such user interfaces include graphical user interfaces and application programming interfaces (APIs). Each user interface may include one or more interface elements 204. For example, users may interact with interface elements in order to access functionality and/or data provided by application 210 and/or data storage 220 layers of the example architecture. Examples of graphical user interface elements 204 include buttons, menus, checkboxes, drop-down lists, scrollbars, sliders, spinners, text boxes, icons, labels, progress bars, status bars, toolbars, windows, hyperlinks and dialog boxes. Application programming interfaces may be local or remote, and may include interface elements such as parameterized procedure calls, programmatic objects and messaging protocols. Service platform extensions may extend the user interface layer by adding a new user interface, replacing an existing user interface and/or extending an existing user interface. An existing user interface may be extended by adding new interface elements, replacing interface elements and/or extending user interface elements.

The application (App) layer 210 may include one or more application modules 211 each having one or more sub-modules 212. The application modules and/or sub-modules may include any suitable computer-executable code such as computer-executable code corresponding to a programming language. For example, programming language source code may be compiled into computer-executable code. Alternatively, or in addition, the programming language may be an interpreted programming language such as a scripting language. Each application server may include each application module. Alternatively, different application servers may include different sets of application modules. Such sets may be disjoint or overlapping. Service platform extensions may extend the application layer by adding new application modules, replacing existing application modules and/or extending existing application modules. An existing application module may be extended by adding new sub-modules, replacing existing sub-modules and/or extending existing sub-modules.

In some embodiments, application layer 210 may include one or more modules 211 or sub-modules 212 that contain executable code that, when executed by a properly programmed processor, cause multi-tenant data processing platform 108 to perform one or more of the following processes, methods, functions or operations as part of implementing an embodiment of the invention:

Identify information or data requiring or desirable of being translated to another language (which may include permitting a user to enter text and searching for a match or similar text in a database);
    Determine if a suitable translation for the information or data is available from a central data storage element (which may be based on application of a rule or algorithm that determines a level of similarity or matching);
    Access and utilize the translation if a suitable translation exists;
    Prepare the information or data for transmission to a translation source if a suitable translation does not exist;
    Receive a proposed translation from the translation source;
    Determine if the proposed translation is acceptable;
    Utilize the proposed translation if it is acceptable; and Determine if the proposed translation should be incorporated into a data storage for potential use by other tenants of a multi-tenant platform.

The data storage layer 220 may include one or more data objects 222 each having one or more data object components 221, such as attributes and/or behaviors. For example, the data objects may correspond to tables of a relational database, and the data object components may correspond to columns or fields of such tables. Alternatively, or in addition, the data objects may correspond to data records having fields and associated services. Alternatively, or in addition, the data objects may correspond to persistent instances of programmatic data objects such as structures and classes. Each data store in the data storage layer may include each data object. Alternatively, different data stores may include different sets of data objects. Such sets may be disjoint or overlapping. Service platform extensions may extend the data storage layer by adding new data objects, replacing existing data objects and/or extending existing data objects. Existing data objects may be extended by adding new data object components, replacing existing data object components and/or extending existing data object components.

Figure 3:
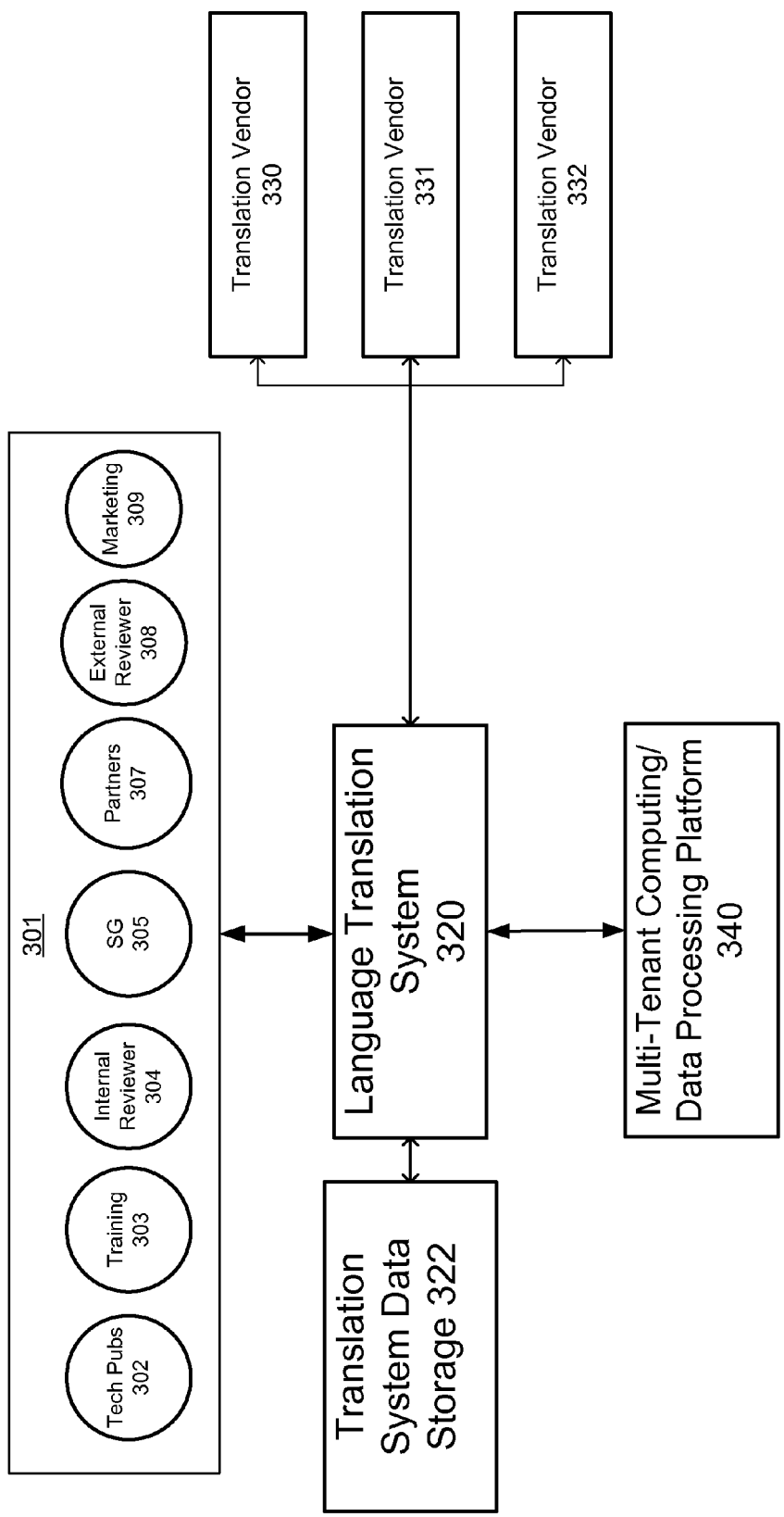
FIG. 3 is a diagram illustrating elements of and participants in using a system, device, or apparatus for implementing an embodiment of the invention.

FIG. 3 is a diagram illustrating elements of and participants in using a system, device, or apparatus for implementing an embodiment of the invention. As shown in the figure, a typical "eco-system" in which an embodiment of the invention may be used includes a set of one or more contributors/users 301, an embodiment of the inventive Language Translation System 320 and associated Translation System data store 322 and one or more external Translation Vendor(s) 330-332. Note that as shown in the figure, an embodiment of the invention will typically be associated with a software development environment or platform, for example the illustrated Multi-Tenant Computing/Data Processing Platform 340 (although usage of an embodiment of the invention is not limited to such an environment or platform, as an embodiment may be used to provide assistance in developing multi-language versions of software applications, user interfaces, "help" files, marketing materials, etc. within any suitable software development environment, publishing context, etc.). Note that Translation System data store 322 may contain previously translated content that is accessible to one or more users of the multi-tenant platform and/or newly translated content prepared for a specific user, where the newly created content may or may not be searchable or discoverable by other users.

In a typical use case for an embodiment of the invention, a software developer or development team is responsible for developing a version of a software application in another language, often as part of an internationalization strategy for a product. One such use case might be to convert certain aspects of an application from English into one or more other languages in order to permit use of the application in other countries. This can be particularly useful if a business sells or wishes to sell the application in multiple countries, or if the application is used by employees in multiple countries to perform their work functions. It may also be helpful if multiple languages are used by employees within a single country to perform their work functions and/or to provide services to users who are not all literate in a single common language.

In such cases, the aspects of an application that may require translation into one or more other languages may include, but are not limited to, such features as help files, user interface screens, comments contained in code, installation instructions, labels on controls or features, drop-down menus, etc. Embodiments of the invention provide a system, apparatus and associated methods for enabling the efficient and cost-effective production of an application or one or more of its sub-modules in additional languages. In some embodiments, the invention also provides a data store (such as element 322 of FIG. 3) containing translated segments/information that may be accessed by multiple users of a common data processing platform to assist those users in developing applications or modifying existing applications (e.g., the users of a multi-tenant business data processing platform, such as that described with reference to FIGS. 1 and 2).

As shown in FIG. 3, the eco-system in which an embodiment of the invention may be used includes one or more contributors/users 301. These may include, for example, technical publications (shown as "Tech Pubs" 302 in the figure) which may provide content that requires translation and use the results to produce publications, training personnel (shown as "Training" 303 in the figure) which may provide content and use the results to produce manuals, etc., an internal reviewer (shown as "Internal Reviewer" 304 in the figure) which represents a person or persons responsible for evaluating the results of a translation process before the results are incorporated into one or more elements, a services/solutions group (shown as "SG" 305 in the figure) which represents another possible contributor of content and/or user of the translated results, one or more external entities that are working with a business to generate the application (shown as "Partners" 307 in the figure), an external reviewer (shown as "External Reviewer" 308 in the figure) which represents an external person or persons responsible for evaluating the results of a translation process (such as an employee of a translation service or a Partner), or a person or persons involved in a marketing function for a business (shown as "Marketing" 309 in the figure) where such a person or persons may contribute and/or use content that is processed by the inventive translation platform and its associated methods.

In some embodiments, contributors/users 301 represents entities that contribute content for translation (i.e., they function as a source of content that requires processing to generate one or more translated versions of the content or as part of the translation process) and/or use the translated content to perform a business function. These entities interact with the inventive Language Translation System/Platform to enable content to be translated and/or to enable previously translated content to be accessed and used. Content that requires translation may be provided to one or more Translation Vendors who perform aspects of the actual translation process. The results of a translation process may be stored in the commonly accessible data storage (e.g., Translation System Data Storage 322 of FIG. 3) and made available to other tenants of a multi-tenant data processing platform or software development environment.

Figure 4:
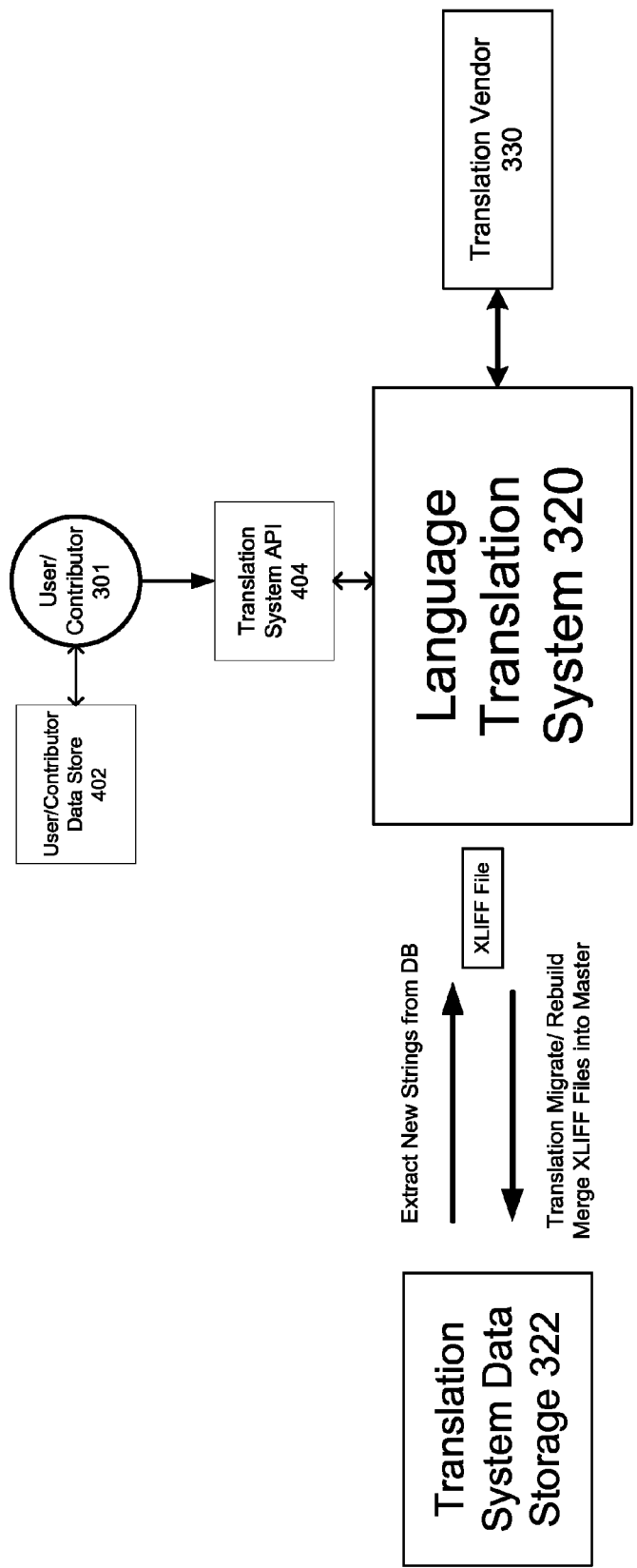
FIG. 4 is a diagram illustrating an example workflow and processing elements that may be used as part of a system, device, apparatus, method, process, operation or function for implementing an embodiment of the invention.

FIG. 4 is a diagram illustrating an example workflow and processing elements that may be used as part of a system, device, apparatus, method, process, operation or function for implementing an embodiment of the invention. As shown in the figure, in one embodiment Translation System Data Storage 322 is coupled to Language Translation System 320 and exchanges data and information with System 320. System 320 may include a processor that, when programmed with a suitable set of instructions, operates to access and retrieve data/information from Data Storage 322, where such data/information may include various forms of language segments that are used by a software developer. The language segments may include labels or other forms of identifiers for user interface elements, content for help files, comments contained in software code, or other words, sentences, character strings, etc. In one embodiment, the language segments may be in (or able to be converted to) a specific format such as a XLIFF file (XML Localization Interchange File Format, a commonly used standard for purposes of internalization of software).

A typical user/contributor 301 may have an associated data store 402 in which is stored one or more language segments used by that user/contributor in the development of software, content, etc. When developing software or content, the user/contributor 301 may first access data store 402 to determine if needed language segments are available from that data store. In one embodiment, if the desired segment(s) are not available from data store 402, then user/contributor 301 may access Translation System 320 via a suitable interface, such as a Translation System API 404. In another embodiment, even if the needed language segments are available from data store 402, the invention may be used to evaluate those segments and suggest replacements that are more consistent with the labeling, field names, and other content that are used by the platform and its other users. This helps to ensure a common set of user interface elements and labels throughout multiple users and developers.

Using API 404 a user/contributor 301 may interact with Translation System 320 to request certain content. As will be described, such a request may be generated as a result of processing certain information about the fields or content of the software being developed (for example) to identify what content is needed. Once identified, information (typically in the form of a XLIFF file) may be retrieved from Data Storage 322 and processed by System 320 before being used for a task or sent to an internal or external Translation Vendor 330 to generate the needed content. The results or output of a Translation Vendor may be received by System 320 and validated to ensure that the translation process was completely and accurately performed by the vendor. System 320 may then (if needed) convert or process the received content into an appropriate format, such as XLIFF. The new content may then be merged or otherwise incorporated into Data Storage 322 so that it may be accessed and retrieved by the same or other users at a later time. Note that although a single Translation Vendor 330 is shown in FIG. 4, a particular translation task may be performed by more than a single such vendor, with the results then being compared or otherwise evaluated before determining which (if any) should be incorporated into Data Store 322.

Figure 5:
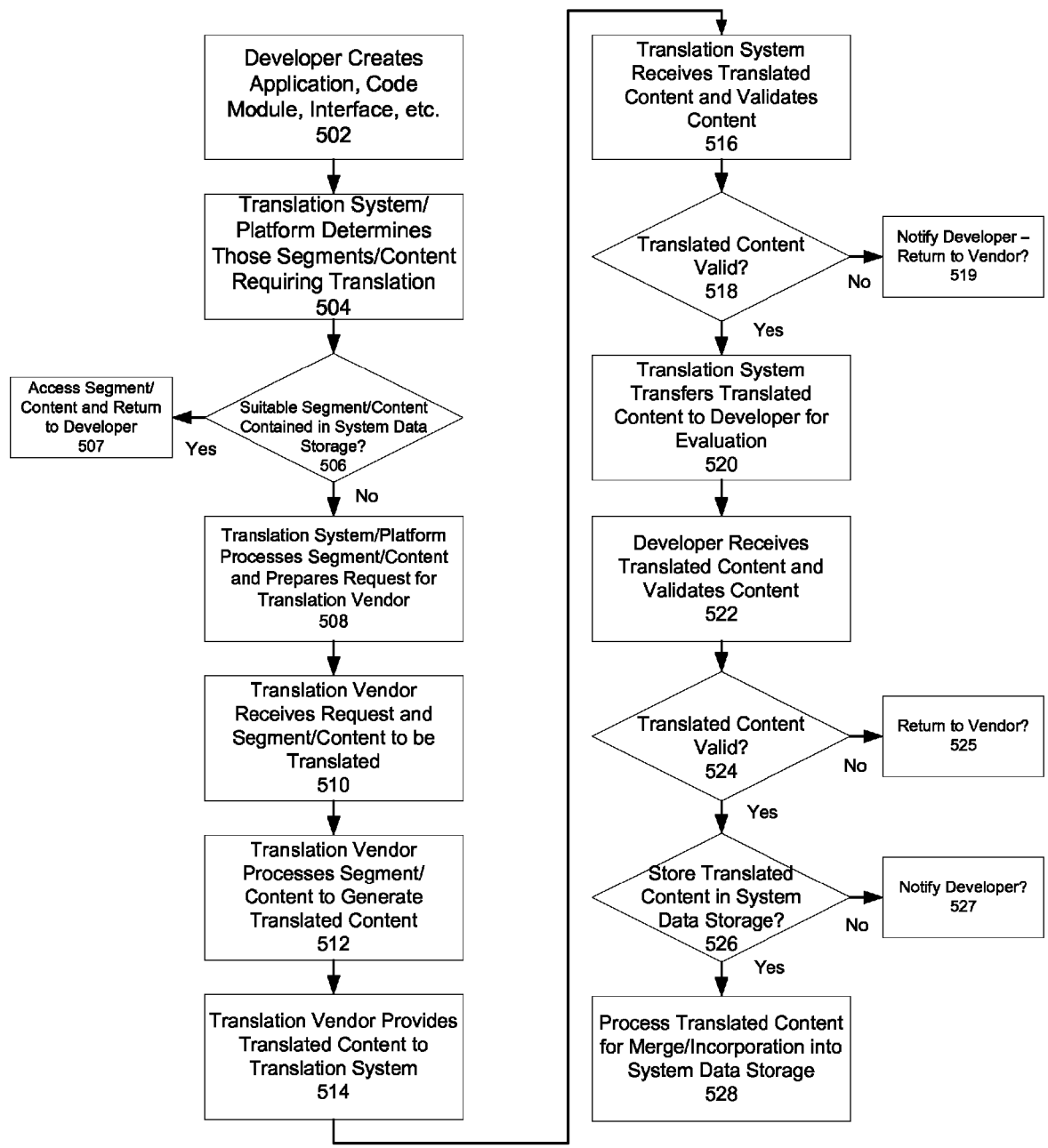
FIG. 5 is a flowchart or flow diagram illustrating an example process, method, function or operation that may be used to implement one or more aspects of an embodiment of the invention.

FIG. 5 is a flowchart or flow diagram illustrating an example process, method, function or operation 500 that may be used to implement one or more aspects of an embodiment of the invention. As shown in the figure, in a typical example a developer creates content that needs to be translated into another language. That content may be software code for an application, elements for a user interface, content for a marketing effort, content for a help file, or another type of content that is desired to be made available in more than one language (step or stage 502). In one embodiment, the developer may first check whether the desired language segments are available from a local data store (not shown). If the desired content is not available (and as suggested previously, even if it is available and as a means of ensuring the usage of common terminology), then the developer may interact with an embodiment of the inventive Translation System, typically via an API. In one embodiment, the Translation System may receive a request or content from the developer and in response process the received content to determine which (if any) content requires translation (step or stage 504) and which content may be available in the System Data Store (step or stage 506). In one embodiment, when content (such as a proposed language segment or query) is received from a user, the invention searches to determine if a suitable match or possible segment is available and can be proposed to the user. This permits a user to determine if a more commonly used, "standardized", or canonical language segment is stored in the translation system database. Use of such a segment is presumed to be more compatible with the multi-tenant platform and the interfaces and extensions used by the tenant users.

The processing involved in determining whether suitable content is available in the System Data Store may be based on determining which fields the developer has utilized, the types of user interface elements utilized, the categories of content utilized, or another suitable method. The Translation System may also (or instead) permit the developer to determine the content of the System Data Store (via a list, index, search function, etc.) and thereby identify terms, labels, field names, etc. that are already available for use in one or more languages. In some embodiments, this processing may also be dependent on or related to the context of the application being developed; for example, an application being created for use in a Medical context might have suggestions for replacing the term 'Name' with 'Patient' and its related translations. If the desired content is available in the System Data Store (corresponding to the "Yes" branch of step 506), then the desired language segment/content may be accessed and returned to the developer (step or stage 507).

If the desired content (or something considered suitable by the user) is not available in the System Data Store (corresponding to the "No" branch of step 506), then the Translation System processes the developer's content and prepares a request for translation services from a translation vendor (step or stage 508). This processing may include formatting of the content to be translated (such as into XLIFF or another suitable form), construction of a request for services in accordance with the vendor's or the system's protocols, etc. The translation vendor receives the request and the segment/content requiring translation, along with other information that may be needed to determine the parameters of the requested task (step or stage 510). The translation vendor processes the request and the associated segment/content to generate one or more translated versions of the segment/content (stage or step 512). Such translations may represent, for example, user interface labels, marketing materials, instructions, comments, menus, etc. in one or more languages. The translation vendor (or vendors) then provide the translated content to the translation system/platform (stage or step 514).

The translation system/platform receives the translated content from the vendor(s) and may then perform one or more validation or test processes on the received content (stage or step 516). The validation or test processes may include ones selected by the system/platform and/or by the developer, and may include for example, processes to determine if the requested translation operation was completed, processes to determine if the received translated content has any undesired meanings, etc. If the result of the validation or test processes is that the translated content is not acceptable (i.e., not valid, as indicated by the "No" branch of step 518), then the developer may be notified and the content returned to the vendor for re-processing (stage or step 519). If the result of the validation or test processes is that the translated content is acceptable (i.e., valid, as indicated by the "Yes" branch of step 518), then the translation system may transfer the translated content to the developer for evaluation (stage or step 520).

The developer receives the translated content from the system/platform and evaluates the suitability of the translated content for use in their project (stage or step 522). This may involve the developer performing one or more validation or test processes that are specific to the developer's task or project. Such validation or test processes may include determining if the translated content has the proper appearance for use as part of the task or project, determining if the translated content is understandable when integrated with the task or project, etc. If the developer is not satisfied with the translated content (as indicated by the "No" branch of step 524), then the content may be returned to the vendor, either directly or via the system/platform (stage or step 525). If the developer is satisfied with the translated content (as indicated by the "Yes branch of step 524), then the translation system/platform may determine whether to store the translated content in the system data storage (stage or step 526). This may involve determining if the new content is of potential interest to other tenants or developers that use the system/platform (e.g., based on those tenants or developers use of content for a similar purpose in the same language as the new content, legal or contractual limitations on use of the new content, etc.). If the system/platform determines that the new content is not suitable for storage in the system data store (as indicated by the "No" branch of step 526), then the developer may be notified (stage or step 527) so that they are aware of the situation and make sure to store the new content in a local data store. If the system/platform determines that the new content is suitable for storage in the system data store (as indicated by the "Yes branch of step 526), then the new content may be processed for merger/incorporation into the system data storage (stage or step 528). Such processing may include formatting or otherwise structuring the new content for indexing/retrieval from the data storage.

As described, in one embodiment, when a user interface element or other form of content is desired as part of developing an application, the inventive system determines if a suitable "candidate" string or other form of data is available in a commonly accessible data store (as suggested by step 506 of FIG. 5). The "suitability" of the string or other form of data may be determined based on one or more rules, matching heuristics, tests, algorithms, etc., and may operate to determine an exact match, substantially similar match, or similar enough match depending on the developer's criteria. Thus in one embodiment, the system/platform may perform a form of "fuzzy reasoning/matching" or other decision process to determine if a suitable content segment or string is available.

If a suitable match is located in the commonly accessible database, then it may be presented to the developer for approval. If approved it may be incorporated into the application being developed. If a suitable translated version of the content is not available in the commonly accessible database, then a version of the content in a first language may be provided to a translation vendor, service or platform. The version of the content may be processed or formatted as needed for input to the translation vendor, service or platform. The translation vendor, service or platform may be automated, semi-automated, or manual in operation. Upon completion of the translation process the translated content may be returned to the translation system/platform and/or developer for approval and incorporation into the application being developed. Further, and subject to other possible evaluation and/or approval processes, the translated content may be added to the commonly accessible database (data store, repository, etc.) and made available for use by other developers who are utilizing the translation system/platform (such as by virtue of using the same software development environment).

In one embodiment, the translation system data storage element (corresponding to element or component 322 of FIG. 3) may contain standard or common segments or strings that are typically used in an application or user interface. Such standard or common segments or strings may include but are not limited to:

Page/Record Names;
Field Labels;
Field Level Help—describing the function, behavior and data type of fields in the UI;
Descriptive Text—instructions and/or descriptions that appear in the UI pages of the application; or
Confirmation, Error and Notification Messages—text that appears as a result of an action taking place in the application.

The stored segments or strings may be available in one or more languages and may be indexed and searchable by a developer.

In one embodiment, the invention may be used to assist software developers who are developing applications, user interfaces, or extensions of applications or interfaces for users of a multi-tenant data processing system or platform. For example, developers for one tenant may be producing a version of a user interface or application for use by speakers of another language. They may wish to utilize standard translations for certain aspects of the project (such as user interface controls, menu names, field names, etc.) but also need to generate labels or names in another language or languages for other parts of the final product. In this situation, an embodiment of the invention may permit a first tenant to:

develop a user interface, a software application, a new or extended function for an existing application (such as a CRM or ERP process), or other capability for one or more tenants of a multi-tenant platform or development environment using language segments stored in a commonly accessible data storage—the common data store provides the benefit of making the language segments stored therein accessible to multiple tenants of the multi-tenant platform, such as developers who may be developing new or extended capabilities for one or more tenants—note this also provides a way to permit developers/tenants to access and use standardized language segments (where applicable) for their new interfaces, applications, etc., thereby encouraging a degree of uniformity and interoperability across the platform;

request that an external vendor provide a translation or translations for certain elements not found in the data storage;

receive and validate the translations provided by the external vendor;

evaluate (if required) and store the received translations in the commonly accessible data storage; and permit a second tenant to utilize the translations prepared for the first tenant in a user interface or application developed by or for the second tenant (because the new translations are now accessible to the second tenant by virtue of being stored in the commonly accessible data store).

Note that although embodiments of the invention have been described as being used in the context of applications, interfaces or extensions developed by or for a tenant of a multi-tenant platform, the invention may also be used in the context of other types of software development environments. Generally, an embodiment of the invention may be used in a situation wherein an interface, a display, an application or a similar element is being developed and it is desired to be able to produce a version of that element in one or more languages. By integrating an embodiment of the invention into a software development environment or multi-tenant platform, users of the environment or platform may benefit from an efficient and effective system and process for generating, validating, and storing language segments.

In one embodiment, a request for the services of an external translation vendor may be generated, routed for internal approval, and communicated to the vendor using the capabilities of an integrated business data processing platform, such as the Multi-Tenant Distributed Computing/Data Processing Platform of FIG. 1. In this example, the business processes that are enabled by the platform provide an efficient way to generate a purchase request for the translation services, enable the request to be approved and accounted for by an accounts payable function, track the progress of the purchase request and its fulfillment, receive and validate the translated segments, and generate payment for the services.

As noted, embodiments of the invention solve one or more problems encountered when using conventional content translation systems and methods. In particular, conventional translation systems do not address problems that arise in the context of development within a cloud-based multi-tenant software development platform, where these problems are solved by the invention. For example, by embedding the inventive solution into the user experience and screens/workflows, embodiments of the invention enable the efficient production of new applications, interfaces and extensions to existing functionality for multiple tenants of such a platform.

As recognized by the inventor, software vendors have not integrated a suitable translation process into an application development environment. As such, currently available approaches do not provide one or more of the following benefits that are provided by an embodiment of the invention:

Accelerate the ability of partners building applications on a common platform to localize and translate their applications for International markets;

Simplify the process of defining content for translation, extracting that content for submission to a translator, re-importing the translated content into the application, reviewing content in situ for accuracy and completeness, and publishing the finished translated content to a repository for use by other tenants or platform users;

Ensure the consistency and quality of translation by providing users/tenants with a seamless way to utilize a translation memory and glossaries to identify exact (or sufficiently close) matches for language segments (and in some cases, pre-translate them into other languages); and Lower the cost of translation for users/tenants by reducing the word count sent to translators as a result of leveraging pre-translated content that is an exact or sufficiently close match to a desired segment.

As part of implementing one or more embodiments of the invention, the invention may include tools and processes to support platform development efforts and enable the delivery of high quality, timely and economical translation services. These tools/processes will interact with a Translation System Data Store to identify matches to requests and generate "proposals" for matches using available segments, including determining those segments that should be considered for external translation (which may be performed by a machine translation service or by a 3rd party translation services provider). For those terms and written content (e.g., Field Level Help, Help Docs, Operating Manuals, Release Notes, Marketing Collateral, etc.) that are created for a new application and for which a suitable match is not found resident in the Translation System Data Store, the Translation System tools may help prepare a XLIFF (or similar) file extraction for submission to the 3rd party translation service, along with any needed supporting content (data, style guide, etc.) and, similarly, will support a re-importation of the resulting translated content when it has been completed. The application developer will then be able to review the translated content in the languages in which they wish to publish the application, to finalize and catch any problems before release. The translation received can then be submitted for validation and addition to the Translation System Data Store for the benefit of the developer community in the future.

Figure 6:
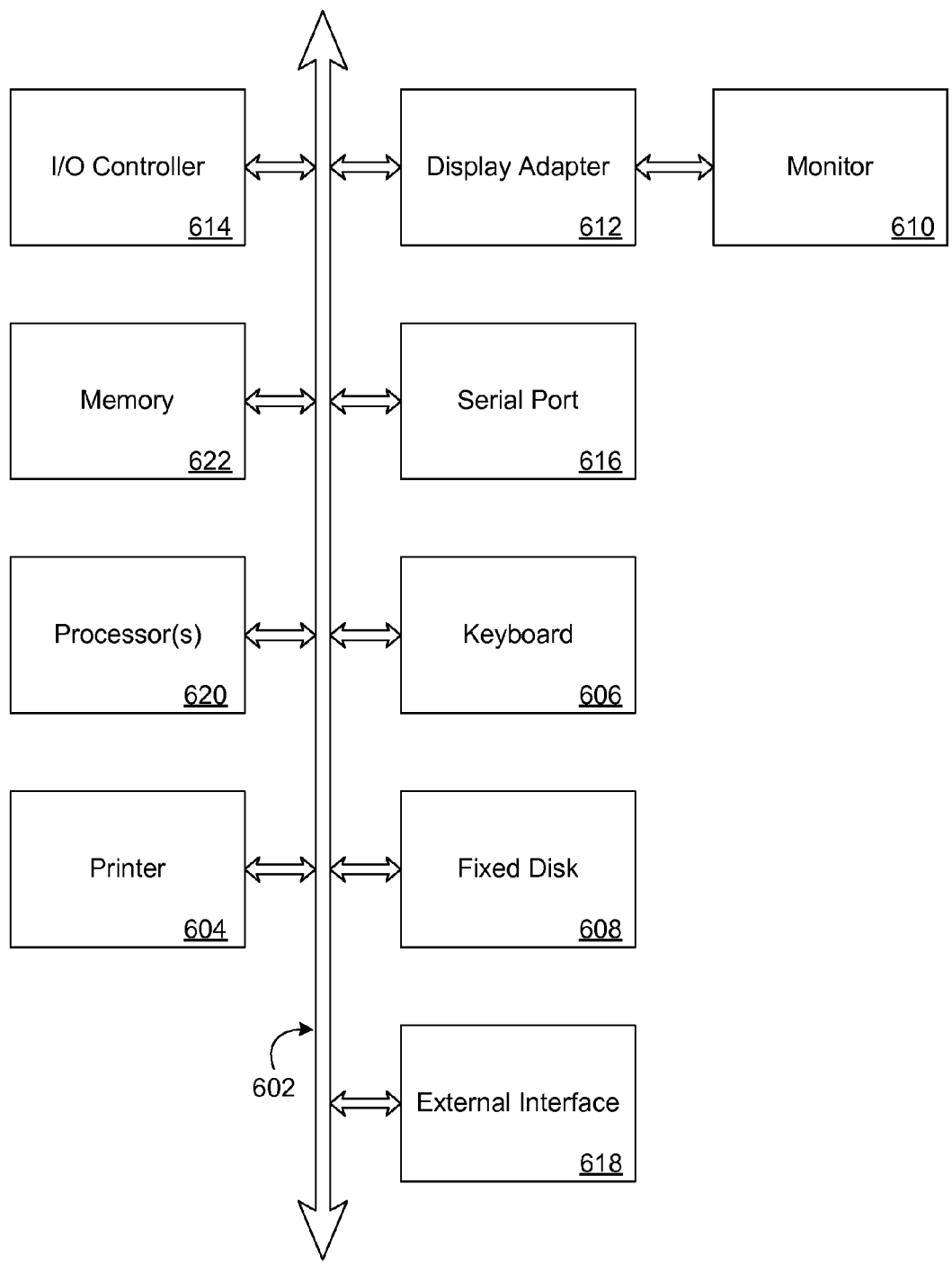
FIG. 6 is a diagram illustrating elements or components that may be present in a computing device, apparatus, architecture, or system configured to implement a method, process, operation, or function in accordance with an embodiment of the invention.

In accordance with at least one embodiment of the invention, the system, apparatus, methods, processes and/or operations for enabling development of software applications in more than a single language may be wholly or partially implemented in the form of a set of instructions executed by one or more programmed computer processors such as a central processing unit (CPU) or microprocessor. Such processors may be incorporated in an apparatus, server, client or other computing device operated by, or in communication with, other components of the system. As an example, FIG. 6 is a diagram illustrating elements or components that may be present in a computing device, apparatus, architecture, or system 600 configured to implement a method, process, operation, or function in accordance with an embodiment of the invention. The subsystems shown in FIG. 6 are interconnected via a system bus 602. Additional subsystems include a printer 604, a keyboard 606, a fixed disk 608, and a monitor 610, which is coupled to a display adapter 612. Peripherals and input/output (I/O) devices, which couple to an I/O controller 614, can be connected to the computer system by any number of means known in the art, such as a serial port 616. For example, the serial port 616 or an external interface 618 can be utilized to connect the computing device 600 to further devices and/or systems not shown in FIG. 6 including a wide area network such as the Internet, a mouse input device, and/or a scanner. The interconnection via the system bus 602 allows one or more processors 620 to communicate with each subsystem and to control the execution of instructions that may be stored in a system memory 622 and/or the fixed disk 608, as well as the exchange of information between subsystems. The system memory 622 and/or the fixed disk 608 may embody a tangible computer-readable medium.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components, processes or functions described in this application may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to each embodiment of the present invention.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

What is claimed is:

1. A multi-tenant data processing system, comprising:
    one or more business related data processing applications installed in the system and accessible by a plurality of tenants of the multi-tenant data processing system;
    a data storage element accessible by a plurality of tenants of the multitenant data processing system;
    a set of software development tools to enable a tenant to develop one or more of a new business related data processing application, an extension to one of the one or more business related data processing applications, a new user interface, an extension to an existing user interface, or content related to an application or user interface;
    a plurality of language segments in one or more languages stored in the data storage element; and
    a processor programmed with a set of instructions, wherein when executed by the processor the instructions cause the system to
        receive a request from a first tenant for a language segment in a specified language;
        determine if the request can be satisfied by a language segment contained in the data storage element;
        provide the language segment contained in the data storage element if the request can be satisfied;
        generate a request for translation services if the request cannot be satisfied by a language segment contained in the data storage element;
        transfer the request to a provider of the translation services; receive a response to the request from the provider of the translation services;
        process the received response to validate the contents of the response;
        provide the translated language segment to the first tenant;
        determine if the translated language segment is to be stored suitable in the data storage element based on a likelihood of interest for use of content expressed in the translated language for a similar purpose by other tenants of the plurality of tenants;
        store the translated language segment in the data storage element if the translated language segment meets a threshold for including in the data storage element;
        receive a request from a second tenant for a language segment in a specified language; and
        provide the translated language segment received in response to the request for translation services to the second tenant in response to the request from the second tenant.

2. The system of claim 1, wherein the one or more business related data processing applications installed in the system include an Enterprise Resource Planning (ERP) or a Customer Relationship Management (CRM) application.

3. The system of claim 1, wherein the set of software development tools include a tool to enable a tenant to define a process or interface using a scripting language.

4. The system of claim 1, wherein the language segment requested by the first tenant is one of a label, a user interface element, a comment, content for a help function, content for a user manual, or content for marketing information.

5. The system of claim 1, wherein determining if the request can be satisfied by a language segment contained in the data storage element further comprises determining if the data storage element contains a language segment in the specified language that is a match for the requested language segment.

6. The system of claim 5, wherein determining if the data storage element contains a language segment in the specified language that is a match for the requested language segment further comprises using a matching or comparison process to determine how close a language segment contained in the data storage element is to the requested language segment.

7. The system of claim 2, wherein generating a request for translation services if the request cannot be satisfied by a language segment contained in the data storage element further comprises executing a process to generate a purchase order for the translation services and updating data contained in the Enterprise Resource Planning application.

8. The system of claim 1, wherein processing the received response to validate the contents of the response further comprises determining if the received response satisfies one or more conditions for acceptance by one or more of the multi-tenant data processing system or the first tenant.

9. The system of claim 8, wherein the one or more conditions for acceptance by one or more of the multi-tenant data processing system or the first tenant include determining one or more of the response provides the translated language segment in the correct language, if the response provides the translated language segment in the correct format, if the response provides all of the requested translations, or if the response provides the translated language segment in a format that is compatible with the data storage element.

10. A system for developing a software application, comprising:
    a data storage element storing a plurality of language segments in one or more languages;
    a processor programmed with a set of instructions, wherein when executed by the processor the instructions cause the system to receive a request from a first user for a language segment in a specified language;

determine if the request can be satisfied by a language segment contained in the data storage element;

provide the language segment contained in the data storage element if the request can be satisfied;

generate a request for translation services if the request cannot be satisfied by a language segment contained in the data storage element;

transfer the request to a provider of the translation services;

receive a response to the request from the provider of the translation services;

process the received response to validate the contents of the response;

provide the translated language segment to the first user;

determine if the translated language segment is to be stored in the data storage element based on a likelihood of interest for use of content expressed in the translated language for a similar purpose by other tenants of the plurality of tenants;

store the translated language segment in the data storage element if the translated language segment meets a likelihood of interest threshold for including in the data storage element;

receive a request from a second user for a language segment in a specified language; and provide the translated language segment received in response to the request for translation services to the second user.

11. The system of claim 10, wherein the language segment requested by the first user is one of a label, a user interface element, a comment, content for a help function, content for a user manual, or content for marketing information.

12. The system of claim 10, wherein determining if the request can be satisfied by a language segment contained in the data storage element further comprises determining if the data storage element contains a language segment in the specified language that is a match for the requested language segment.

13. The system of claim 12, wherein determining if the data storage element contains a language segment in the specified language that is a match for the requested language segment further comprises using a matching or comparison process to determine how close a language segment contained in the data storage element is to the requested language segment.

14. The system of claim 10, wherein generating a request for translation services if the request cannot be satisfied by a language segment contained in the data storage element further comprises generating at least part of the request in a specified format.

15. The system of claim 14, wherein generating the request further comprises executing a process to generate a purchase order for the translation services and updating data contained in an enterprise resource planning system.

16. The system of claim 10, wherein processing the received response to validate the contents of the response further comprises determining if the received response satisfies one or more conditions for acceptance by one or more of the system or the first user.

17. The system of claim 16, wherein the one or more conditions for acceptance by one or more of the system or the first user include determining one or more of the response provides the translated language segment in the correct language, if the response provides the translated language segment in the correct format, if the response provides all of the requested translations, or if the response provides the translated language segment in a format that is compatible with the data storage element.

18. The system of claim 10, wherein the system further comprises:

one or more business related data processing applications installed in the system and accessible by a plurality of tenants of the system; and a set of software development tools to enable a tenant to develop one or more of a new business related data processing application, an extension to one of the one or more business related data processing applications, a new user interface, an extension to an existing user interface, or content related to an application or user interface.

19. A method for developing software, comprising:

providing one or more business related data processing applications installed on a multi-tenant data processing platform and accessible by a plurality of tenants of the multi-tenant data processing platform;

providing a data storage element accessible by a plurality of tenants of the multi-tenant data processing platform;

providing a set of software development tools to enable a tenant to develop one or more of a new business related data processing application, an extension to one of the one or more business related data processing applications, a new user interface, an extension to an existing user interface, or content related to an application or user interface;

providing a plurality of language segments in one or more languages stored in the data storage element; and providing a processor programmed with a set of instructions, wherein when executed by the processor the instructions cause the multi-tenant data processing platform to receive a request from a first tenant for a language segment in a specified language;

determine if the request can be satisfied by a language segment contained in the data storage element;

provide the language segment contained in the data storage element if the request can be satisfied;

generate a request for translation services if the request cannot be satisfied by a language segment contained in the data storage element;

transfer the request to a provider of the translation services; receive a response to the request from the provider of the translation services;

process the received response to validate the contents of the response;

provide the translated language segment to the first tenant;

determine if the translated language segment is to be stored in the data storage element based on a likelihood of interest for use of content expressed in the translated language for a similar purpose by other tenants of the plurality of tenants;

store the translated language segment in the data storage element if the translated language segment meets a likelihood of interest threshold for including in the data storage element;

receive a request from a second tenant for a language segment in a specified language; and provide the translated language segment received in response to the request for translation services to the second tenant in response to the request from the second tenant.

20. The method of claim 19, wherein the one or more business related data processing applications installed in the system include an Enterprise Resource Planning (ERP) or a Customer Relationship Management (CRM) application.

* * * * *